(12) United States Patent
Oka et al.

(10) Patent No.: US 11,450,917 B2
(45) Date of Patent: Sep. 20, 2022

(54) POWER STORAGE DEVICE

(71) Applicant: Panasonic Intellectual Property Management Co., Ltd., Osaka (JP)

(72) Inventors: Takuya Oka, Hyogo (JP); Hiroshi Yoshizawa, Hyogo (JP); Shigeki Matsuta, Hyogo (JP); Yoshiaki Araki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/639,845

(22) PCT Filed: Dec. 27, 2018

(86) PCT No.: PCT/JP2018/048270
§ 371 (c)(1),
(2) Date: Feb. 18, 2020

(87) PCT Pub. No.: WO2019/142645
PCT Pub. Date: Jul. 25, 2019

(65) Prior Publication Data
US 2021/0135317 A1    May 6, 2021

(30) Foreign Application Priority Data

Jan. 17, 2018 (JP) .............................. JP2018-005828

(51) Int. Cl.
*H01M 50/293* (2021.01)
*H01M 50/289* (2021.01)
*H01M 50/291* (2021.01)

(52) U.S. Cl.
CPC ....... *H01M 50/293* (2021.01); *H01M 50/289* (2021.01); *H01M 50/291* (2021.01)

(58) Field of Classification Search
CPC ..................................... H01M 50/289–50/293
See application file for complete search history.

(56) References Cited

U.S. PATENT DOCUMENTS

| | | | |
|---|---|---|---|
| 9,324,982 B2 * | 4/2016 | Park .................... | H01M 50/572 |
| 2012/0171554 A1 | 7/2012 | Kim | |

(Continued)

FOREIGN PATENT DOCUMENTS

| | | |
|---|---|---|
| CN | 103325977 A | 9/2013 |
| CN | 206059484 U | 3/2017 |

(Continued)

OTHER PUBLICATIONS

International Search Report dated Mar. 19, 2019, issued in counterpart International Application No. PCT/JP2018/048270. (1 page).

(Continued)

*Primary Examiner* — Jonathan Crepeau
(74) *Attorney, Agent, or Firm* — WHDA, LLP

(57) ABSTRACT

The power storage device is provided with a cell stack body formed by alternately arranging a plurality of secondary cells and a plurality of buffer plates. Each of the buffer plates has a non-deformable section and a deformable section that is elastically deformed according to a volume change in the secondary cell. The non-deformable section has a through hole in which the deformable section is fitted. The deformable section is formed thicker than the non-deformable section.

1 Claim, 4 Drawing Sheets

(56) References Cited

U.S. PATENT DOCUMENTS

| | | | | |
|---|---|---|---|---|
| 2013/0108908 A1* | 5/2013 | Omura | ................. | H01M 50/20 |
| | | | | 429/94 |
| 2013/0252063 A1 | 9/2013 | Park | | |
| 2017/0244088 A1* | 8/2017 | Narbonne | ......... | H01M 10/0525 |
| 2020/0365853 A1* | 11/2020 | Hashimoto | ........... | H01M 50/20 |

FOREIGN PATENT DOCUMENTS

| | | | |
|---|---|---|---|
| JP | 2012-142288 A | 7/2012 |
| JP | 2013-97888 A | 5/2013 |
| JP | 2014-157747 A | 8/2014 |
| JP | 2016-091718 A | 5/2016 |
| JP | 2016-189342 A | 11/2016 |
| JP | 2017-152338 A | 8/2017 |

OTHER PUBLICATIONS

English Translation of Search Report dated Dec. 3, 2021, issued in counterpart to CN Application No. 201880054213.9. (3 pages).
English Translation of Chinese Search Report dated Jun. 27, 2022, issued in counterpart CN application No. 201880054213.9. (2 pages).

* cited by examiner

POWER STORAGE DEVICE

TECHNICAL FIELD

The present disclosure relates to a power storage device.

BACKGROUND ART

Hitherto, a power storage device including secondary cells and buffer plates are known. For example, PTL 1 discloses a power storage device formed of a plurality of secondary cells electrically coupled to each other and a plurality of buffer plates alternately arranged in a predetermined direction, which are bound while a load is applied thereto in a direction of the above arrangement. Furthermore, PTL 1 discloses a configuration in which a deformable section that allows a volume change in the secondary cell caused by charging and discharging is formed in a contact surface of the buffer plate in contact with the secondary cell, and in which a non-deformable section that does not allow the volume change of the secondary cell is formed.

CITATION LIST

Patent Literature

PTL 1: Japanese Published Unexamined Patent Application No. 2014-157747 Summary of Invention As described above, by being charged and discharged, the secondary cells constituting the power storage device expand and contract and change the volume thereof. In other words, the volume of the secondary cells changes according to the charging rate (a state of charge: SOC). When the SOC of the secondary cells is low, force binding the secondary cells becomes small due to the contraction of the secondary cells; accordingly, it is assumed that it will be difficult to hold the secondary cells in a stable manner and a deviation between the electrode plates caused by vibration will occur. On the other hand, when the SOC is high, reactive force generated by the expansion of the secondary cells becomes large; accordingly, it is assumed that the pressure applied to the electrode bodies will increase and the cycle characteristics will become degraded.

An object of the present disclosure is to provide a power storage device capable of holding the secondary cells in a stable manner while allowing the volume change in the secondary cells caused by charging and discharging.

A power storage device that is an aspect of the present disclosure includes at least one secondary cell, and at least two buffer plates each in contact with one of sidewalls of the secondary cell that oppose each other. In the power storage device, each buffer plate includes a non-deformable section, and a deformable section that elastically deforms with a volume change in the secondary cell, the non-deformable section includes a through hole or a recessed portion in which the deformable section is fitted, and the deformable section is formed thicker than the non-deformable section.

According to an aspect of the present disclosure, a power storage device capable of holding the secondary cells in a stable manner while allowing the volume change in the secondary cells caused by charging and discharging can be provided. According to the power storage device that is the aspect of the present disclosure, when the SOC is low, the resistance of the secondary cells against vibration is improved, and when the SOC is high, the reactive force generated by the expansion of the secondary cells can be suppressed.

DESCRIPTION OF EMBODIMENTS

Figure 1:
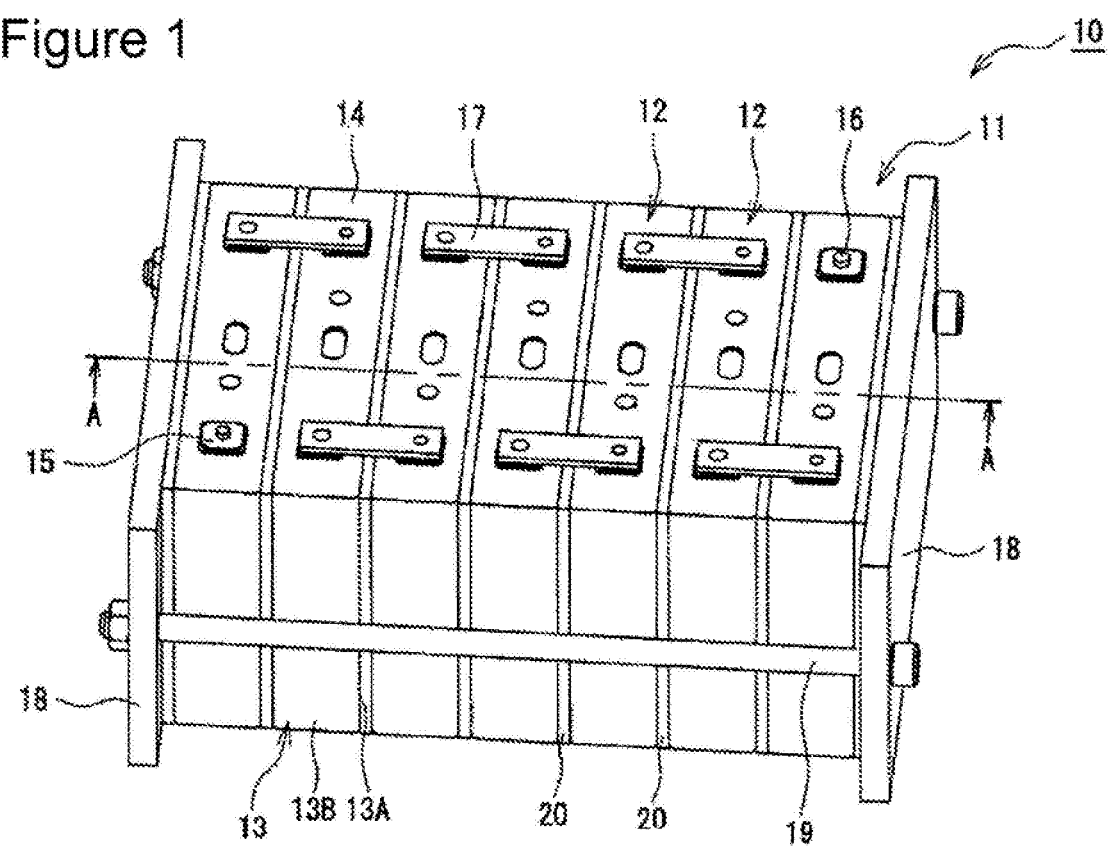
FIG. 1 is a perspective view of a power storage device that is an example of an embodiment.

Hereinafter, referring to the drawings, examples of an embodiment will be described in detail. Note that the power storage device of the present disclosure is not limited to the embodiment described below. The drawings referred to in describing the embodiment are illustrated in a schematic manner, and the dimension ratio and the like of the components depicted in the drawings are to be determined after taking the following description into consideration. Note that in the present description, the expression "substantially" is, when described with "substantially parallel" as an example, intended to mean both a completely parallel state and a practically parallel state.

While a power storage device provided with a cell stack body including a plurality of secondary cells and a plurality of buffer plates is illustrated hereinafter as an example, the power storage device according to the present disclosure may be configured of a single secondary cell and two buffer plates that abut against sidewalls of the cell that oppose each other. Furthermore, while a description that the plurality of secondary cells that constitute the cell stack body are electrically coupled to each other will be given, the secondary cells do not have to be electrically coupled to each other and only some of the plurality of secondary cells may be electrically coupled to each other. In other words, the plurality of secondary cells that constitute the single cell stack body may be configured to be electrically coupled to a power source individually or per each predetermined block in a chargeable and dischargeable manner.

While a stacked electrode body formed by alternately stacking a plurality of positive electrodes and a plurality of negative electrodes with a separator in between is illustrated as an example as the electrode body that constitutes the secondary cell, the electrode body may be of a wound type in which a long positive electrode and a long negative electrode are wound with a separator in between.

Figure 2:
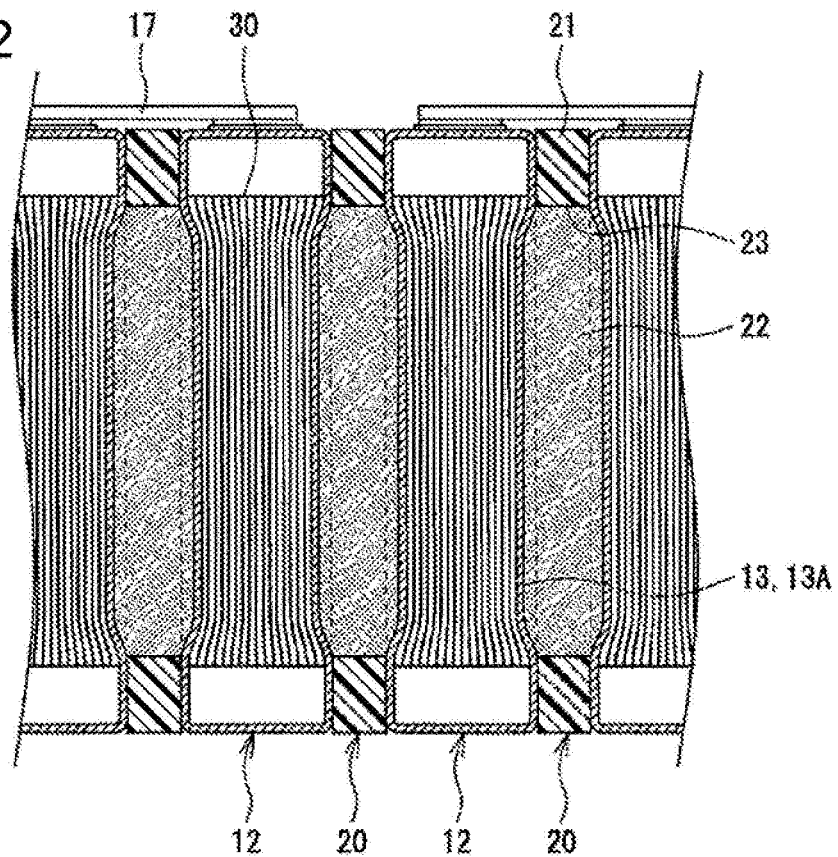
FIG. 2 is a diagram illustrating a portion of a cross section taken along line AA in FIG. 1, and illustrates a state in which SOC of secondary cells is 0%.
Figure 3:
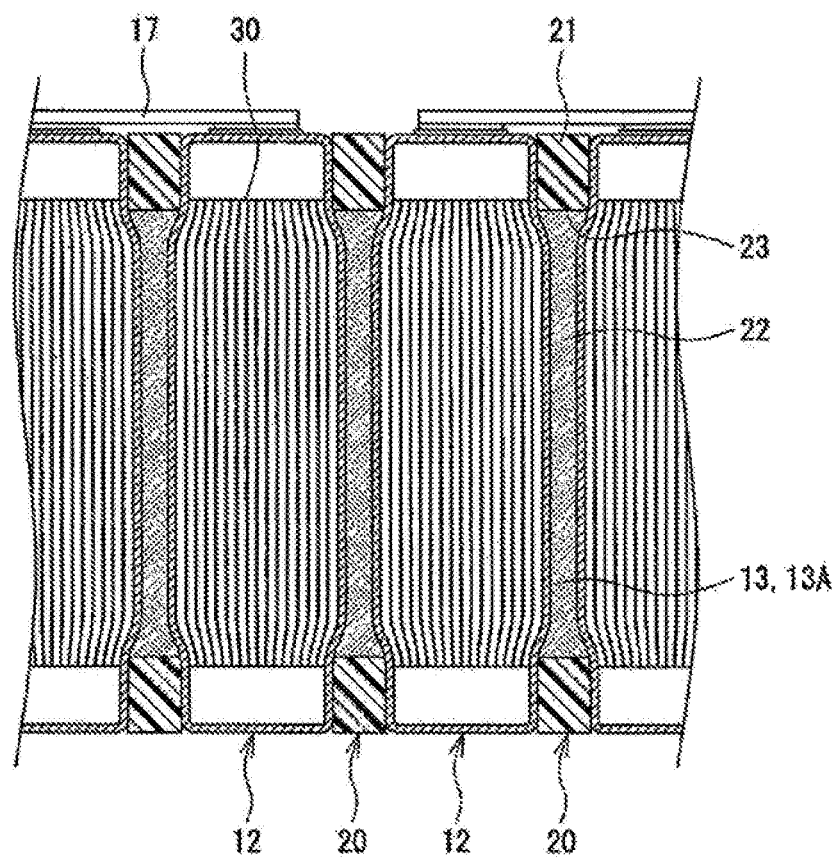
FIG. 3 is a diagram illustrating a portion of the cross section taken along line AA in FIG. 1, and illustrates a state in which the SOC of the secondary cells is 100%.

FIG. 1 is a perspective view of a power storage device 10, which is an example of the embodiment. FIGS. 2 and 3 are diagrams each illustrating a portion of a cross section taken along line AA in FIG. 1. FIG. 2 illustrates a state in which the SOC of the secondary cells 12 is 0%, and FIG. 3 illustrates a state in which the SOC of the secondary cells 12 is 100%.

As illustrated as an example in FIGS. 1 to 3, the power storage device 10 includes a cell stack body 11 formed by alternately disposing the plurality of secondary cells 12 and a plurality of buffer plates 20. Furthermore, the power storage device 10 includes a pair of end plates 18 that press the cell stack body 11 from both sides in a direction in which the secondary cells 12 and the buffer plates 20 are arranged. In the present embodiment, the plurality of secondary cells 12 and the plurality of buffer plates 20 that constitute the cell stack body 11 are arranged in the horizontal direction. Hereinafter, for convenience of description, a direction in which the secondary cells 12 and the buffer plates 20 are arranged is "a first direction or a thickness direction", a direction in the horizontal direction that is orthogonal to the first direction is "a second direction or a lateral direction" and a direction orthogonal to the first and second direction is "an up-down direction".

The power storage device 10 is a group cell configured by electrically coupling the plurality of secondary cells 12 to each other, and is also referred to as a battery module or a battery pack. In the present embodiment, all of the secondary cells 12 constituting the cell stack body 11 are electrically coupled to each other. An example of the secondary cell 12 includes a nonaqueous electrolyte secondary battery, such as a lithium ion battery. While the cell stack body 11 in the example illustrated in FIG. 1 is configured of seven secondary cells 12 that are square batteries, the number of secondary cells 12 is not limited to any number in particular.

The power storage device 10 includes bind bars 19 connected to the end plates 18 so that a predetermined clamp pressure acts on the cell stack body 11 with the pair of end plates 18. The end plates 18 are each a plate body that is slightly longer than the secondary cell 12 in the second direction (the lateral direction), and hold the cell stack body 11 from both sides in the first direction. The bind bars 19 are each a rod-like member provided in the first direction, for example, and are provided on both sides of the cell stack body 11 in the second direction.

In the present embodiment, two bind bars 19 are attached across the pair of end plates 18. In other words, the pair of end plates 18 are connected to each other by two bind bars 19. Specifically, one end portion of the bind bar 19 is fastened to one of the end plates 18 and the other end portion of the bind bar 19 is fastened to the other end plate 18 so that a predetermined clamp pressure acts on the cell stack body 11 with the end plates 18. The clamp pressure can be changed by adjusting the fastening force of the bind bars 19 acting on the end plates 18.

The secondary cells 12 constituting the cell stack body 11 each include a cell case including an outer can 13 and a sealing plate 14 that closes an opening portion of the outer can 13. In the cell stack body 11, the secondary cells 12 and the buffer plates 20 are disposed alternately so that the sealing plates 14 of the secondary cells 12 are oriented in the same direction and so that the heights of the sealing plates 14 match each other. An electrode body 30, which is a power generation element, and an electrolyte are accommodated in the outer can 13. Note that in place of the electrolyte, a solid electrolyte using gelatinous polymer or the like may be used.

The cell case illustrated as an example in FIG. 1 is a square metal case including the bottomed and tubular outer can 13 and the sealing plate 14 that has, in plan view, a substantially rectangular shape long in the lateral direction. The outer can 13 includes two sidewalls 13A disposed so as to oppose each other, two sidewalls 13B disposed so as to oppose each other, and a bottom surface portion having, in bottom view, a substantially rectangular shape long in the lateral direction. The four sidewall portions are, for example, formed substantially perpendicular to the bottom surface portion. An upper surface portion of the cell case is formed by the sealing plate 14.

The secondary cell 12 includes a positive electrode terminal 15 and a negative electrode terminal 16. For example, the positive electrode terminal 15 is provided on a first end side of the sealing plate 14 in the lateral direction, and the negative electrode terminal 16 is provided on a second end side of the sealing plate 14 in the lateral direction. The cell stack body 11 includes a plurality of bus bars 17 that couple electrode terminals of adjacent secondary cells 12 to each other. In the present embodiment, the secondary cells 12 are arranged so that the positions of the positive electrode terminal 15 and the negative electrode terminal 16 are opposite of those of the adjacent secondary cell 12, and the adjacent secondary cells 12 are connected in series with the bus bar 17. In other words, the bus bar 17 couples the positive electrode terminal 15 of one secondary cell 12 and the negative electrode terminal 16 of another adjacent secondary cell 12 to each other.

The electrode body 30 is a stacked electrode body in which a plurality of positive electrodes 31 (see FIG. 5 described later) and a plurality of negative electrodes that are stacked alternately in the first direction with a separator in between. The negative electrode is typically a size larger than the positive electrode 31, and a portion of the positive electrode 31 where a mixture layer is formed is always disposed so as to oppose a mixture layer of the negative electrode. The electrode body 30 may use a plurality of separators, or a single separator folded in a zigzag manner may be used. The stacked structure of the electrode body 30 is maintained by, for example, the buffer plates 20 pressing the secondary cells 12 from both sides in the thickness direction. Note that in FIG. 2, while the electrode bodies 30 are accommodated inside the outer cans 13 so as not to be in contact with the bottom surface portions of the outer cans 13, the electrode bodies 30 may be in contact with the bottom surface portions.

In the present embodiment, the positive electrode 31 and the negative electrodes are disposed so as to be substantially parallel with the sidewalls 13A of the outer can 13. Furthermore, each sidewall 13A is disposed substantially parallel with each end plate 18. Accordingly, the above-described clamp pressure of the pair of end plates 18 acting on the cell stack body 11, in other words, the binding force of the secondary cells 12, acts on the sidewalls 13A. The sidewalls 13A are larger than the sidewalls 13B, and the areas thereof are formed larger than those of the positive electrodes 31 and the negative electrodes. The sidewall 13B in the thickness direction is formed longer than the thickness of the electrode body 30. For example, the sidewall 13A has a substantially rectangular shape in which the lateral direction is longer than the up-down direction, and the sidewall 13B has a substantially rectangular shape in which the up-down direction is longer than the thickness direction. Among the sidewalls 13A and 13B in the secondary cell 12, only the sidewalls 13A are deformed with the volume change in the electrode body 30 caused by charging and discharging.

The buffer plate 20 is interposed between two secondary cells 12 and are in contact with the sidewalls 13A of the secondary cells 12. In the example illustrated in FIG. 1, each buffer plate 20 is also disposed between the corresponding secondary cell 12 and the corresponding end plate 18. The cell stack body 11 includes eight buffer plates 20 that is one member more than the secondary cell 12. The clamp pressure created by the end plates 18 is transmitted to the sidewalls 13A of the secondary cells 12 through the buffer plates 20, and acts on the electrode bodies 30 through the sidewalls 13A. The buffer plates 20 have a function of maintaining the distance between the terminals of the adjacent secondary cells 12 constant while allowing the volume changes in the secondary cells 12.

Figure 4:
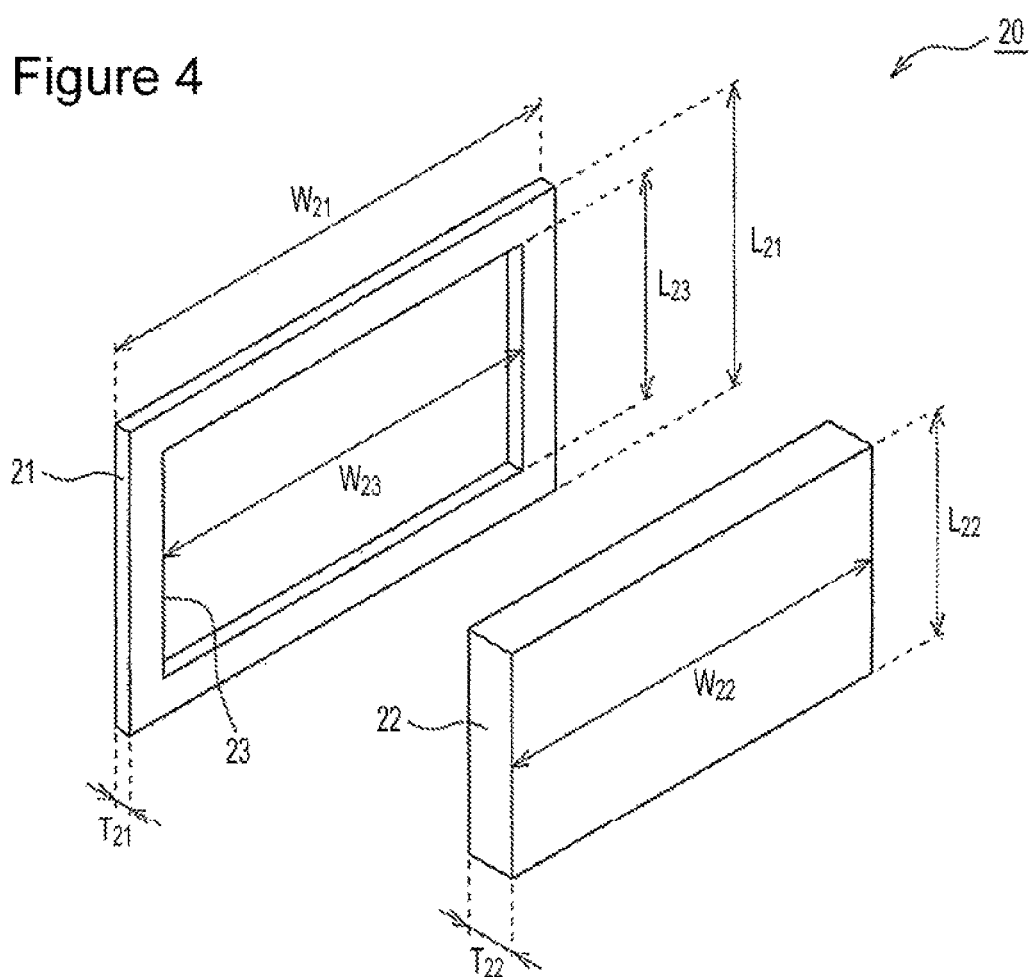
FIG. 4 is an exploded perspective view of a buffer plate that is an example of the embodiment.
Figure 5:
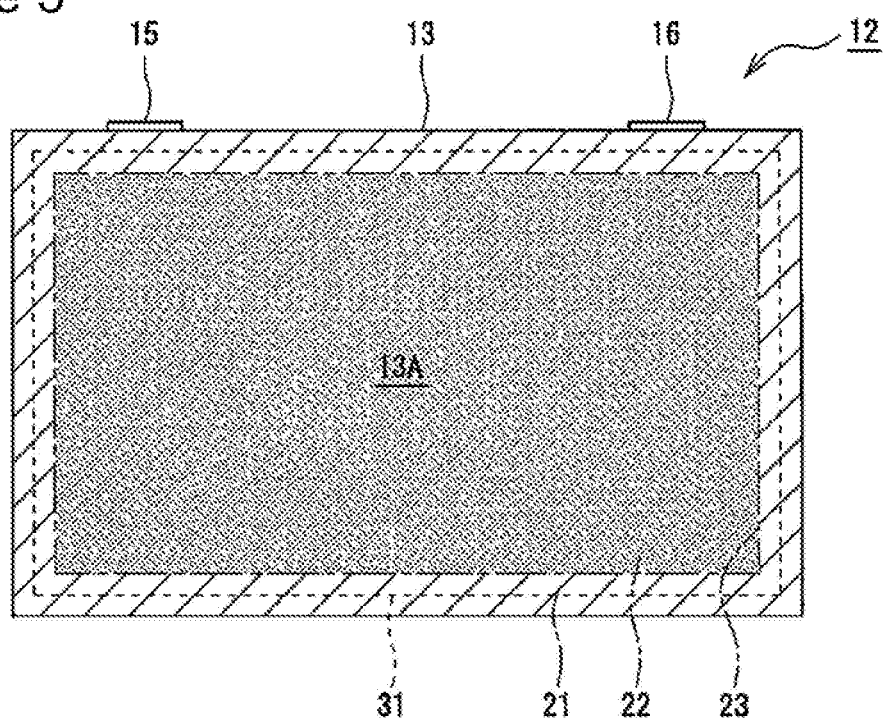
FIG. 5 is a diagram illustrating a size and an arrangement of the buffer plate that is an example of the embodiment.

Hereinafter, referring further to FIGS. 4 and 5, a detailed description of the buffer plate 20 will be given. FIG. 4 is an exploded perspective view of the buffer plate 20, and FIG. 5 is a diagram illustrating the size and the arrangement of the buffer plate 20.

As illustrated as an example in FIGS. 2 to 4, each buffer plate 20 includes a non-deformable section 21, and a deformable section 22 that elastically deforms with the volume change in the secondary cell 12. The non-deformable section 21 includes a through hole 23 in which the deformable section 22 is fitted. In a state in which the deformable section 22 is inserted in the through hole 23 of the non-deformable section 21, the buffer plate 20 is disposed between a gap between two secondary cells 12. Furthermore, the deformable section 22 is formed thicker than the non-deformable section 21. With the configuration in which the deformable section 22 that is thicker than the non-deformable section 21 is inserted in the through hole 23, the volume change in the secondary cell 12 can be followed efficiently without an increase in the gap (hereinafter, also referred to as an "inter-cell distance") between adjacent secondary cells 12.

In the present description, dimensions such as the thickness and the like of the deformable section 22 denote dimensions thereof when no load is applied thereto. When the buffer plate 20 is detached from the gap of the secondary cell 12, or when in a state (see FIG. 2) in which a compressive load becomes small due to the thickness of the secondary cell 12 being reduced by a decrease in the SOC, the deformable section 22 protrudes in the first direction from both sides of the non-deformable section 21 in the thickness direction. Furthermore, the deformable section 22 is compressed to a certain degree in the thickness direction even when directly after the power storage device 10 has been manufactured and even when the SOC of the secondary cell 12 is 0%. In such a case, even when the SOC of the secondary cell 12 is 0%, pressing force (restoring force) from the deformable sections 22 acts on the sidewalls 13A, and the electrode body 30 is held through the sidewalls 13A.

The non-deformable section 21 is a portion that practically does not deform with the volume change in the secondary cell 12, and is configured of a material having an elastic modulus that is higher than that of the deformable section 22. The non-deformable section 21 is configured of an insulating resin material having high rigidity, for example. By having the buffer plate 20 include the non-deformable section 21, the shape of the buffer plate 20 becomes stable, and it will be possible to bind and hold the secondary cell 12 in a more stable manner. Furthermore, by providing the non-deformable section 21, the inter-terminal distance between the secondary cells 12 can be maintained constant easily.

The deformable section 22 is a portion that becomes deformed with the volume change in the secondary cell 12, and is configured of a material that is more flexible than the non-deformable section 21 and that has a low elastic modulus. The deformable section 22 is configured of insulating rubber, foam, elastomer, for example. Specific examples include rubber such as silicone rubber, fluorine rubber, and ethylene-propylene rubber, and foams such as polyurethane, polyolefin, polystyrene, polyimide, phenol resin, and silicone resin. By having the buffer plate 20 include the deformable section 22, the volume change in the secondary cell 12 can be absorbed, and the reactive force generated by the expansion of the secondary cell 12 can be suppressed. When the SOC becomes low and the secondary cell 12 contracts, the resistance of the secondary cell 12 against vibration can be improved by pressing the sidewalls 13A.

Furthermore, by using a porous material such as foam or a material with low thermal conductivity such as NASBIS (registered trademark) in the deformable sections 22, the thermal insulation performance between the secondary cells 12 is improved and the function of suppressing spread of fire is improved.

As illustrated as an example in FIG. 4, the non-deformable section 21 is formed in a frame shape so as to be in contact with a peripheral portion of the sidewall 13A. While not limited to any shape in particular, the shape of the through hole 23 is, desirably, rectangular. The through hole 23 is desirably formed in a wide area including the middle portion of the non-deformable section 21. The through hole 23 is formed so as to leave a frame portion having a substantially constant width in the peripheral portion of the non-deformable section 21 so that the hole edge is substantially parallel to the edges of the non-deformable section 21, for example. The non-deformable section 21 is a rectangular frame in which a length $W_{21}$ in the lateral direction is longer than a length $L_{21}$ in the up-down direction, and is disposed so that the longitudinal direction thereof extends in the lateral direction of the cell stack body 11.

In the power storage device 10, the shortest distance between two adjacent secondary cells 12 is determined by a thickness $T_{21}$ of the non-deformable section 21. In other words, the inter-cell distance (the shortest distance) is substantially the same as the thickness $T_{21}$. An example of the thickness $T_{21}$ of the non-deformable section 21 is 1 mm to 3 mm. Since the thickness $T_{21}$ does not change even when the volume of the secondary cell 12 changes, the inter-cell distance is maintained in a constant manner regardless of the SOC of the secondary cell 12. On the other hand, a thickness $T_{22}$ of the deformable section 22 changes so as to follow the volume change in the secondary cell 12.

The deformable section 22 is a flat rectangular parallelepiped, and has a thickness $T_{22}$ that is larger than the thickness $T_{21}$ of the non-deformable section 21. Note that when the secondary cell 12 becomes expanded due to the increase in the SOC, the deformable section 22 becomes compressed and the thickness $T_{22}$ becomes smaller than the thickness $T_{21}$. In other words, the deformable section 22 has a thickness that is larger than that of the non-deformable section 21 when the deformable section 22 is not compressed. The thickness $T_{22}$ of the deformable section 22 changes at least 200 μm due to the volume change in the secondary cell 12, for example.

The thickness $T_{22}$ of the deformable section 22 is smaller than the sum of the thickness of the secondary cell 12 and the thickness $T_{21}$ of the non-deformable section 21 and, preferably, is smaller than the thickness of the secondary cell 12. The thickness $T_{22}$ is, for example, 1.5 times to 3 times the thickness of the thickness $T_{21}$ of the non-deformable section 21 and, specifically, is 1.5 mm to 9 mm.

The deformable section 22 is formed of a size that can be inserted in the through hole 23 of the non-deformable section 21. Since the deformable section 22 elastically deforms, the deformable section 22 may have a dimension that is larger than that of the through hole 23; however, in order to efficiently absorb the increase in the volume of the secondary cell 12, it is desirable that the deformable section 22 is formed of a dimension that is equivalent to or smaller than that of the through hole 23. In other words, it is desirable that the conditions a length $W_{22}$ of the deformable section 22 in the lateral direction ≤ a length $W_{23}$ of the through hole 23 in the lateral direction, and a length $L_{22}$ of the deformable section 22 in the up-down direction ≤ a length $L_{23}$ of the through hole 23 in the up-down direction are satisfied.

FIG. 5 is a front view of the secondary cell 12, in which the buffer plate 20 is depicted by an imaginary line. In FIG. 5, in the sidewall 13A of the outer can 13, a slanted hatching is added to a portion in contact with the non-deformable section 21, and a dotted hatching is added to a portion in contact with the deformable section 22.

As illustrated as an example in FIG. 5, desirably, the surface (hereinafter, may also be referred to as a "contact surface") of the buffer plate 20 in contact with the secondary cell 12 is larger than the positive electrode 31, and the buffer plate 20 is disposed so as to oppose the entire positive electrode 31 with the sidewall 13A in between. In a case in which a collector exposed portion in which the mixture layer such as a lead portion and the like does not exist is formed in the positive electrode 31, it is only sufficient that the contact surface of the buffer plate 20 is larger than the portion other than the exposed portion of the positive electrode 31. In other words, an area of the contact surface of the buffer plate 20 is, desirably, larger than an area of the positive electrode 31 where the mixture layer is formed. On the other hand, from the viewpoint of miniaturization and the like of the power storage device 10, desirably, the area of the contact surface of the buffer plate 20 is equivalent to or less than an area of the sidewall 13A of the outer can 13.

In the present embodiment, the contact surface of the buffer plate 20 has an area that is substantially the same as that of the sidewall 13A of the outer can 13, and is formed so as to have an area that is larger than those of the positive electrode 31 and the negative electrode. Furthermore, in order for the buffer plate 20 to not bulge out from between the secondary cells 12, the peripheral edge of the contact surface is disposed so as to substantially coincide with the peripheral edge of the sidewall 13A.

The non-deformable section 21 is, desirably, disposed so that the edge portion of the through hole 23 opposes the peripheral portion of the positive electrode 31 with the sidewall 13A in between. Since the negative electrode is a size larger than the positive electrode 31, in the above case, the edge portion of the through hole 23 is disposed so as to oppose a peripheral portion of the negative electrode. In other words, the peripheral portion of the electrode plate is pressed down by the non-deformable section 21. On the other hand, it is desirable that the non-deformable section 21 does not oppose the wide area of the electrode plate other than the peripheral portion. Accordingly, the through hole 23 is formed of a size in which the non-deformable section 21 only opposes the peripheral portion of the electrode plate. In such a case, while the expansion of the electrode body 30 at the peripheral portion of the electrode plate that opposes the non-deformable section 21 is suppressed, the binding force acting on the electrode body 30 becomes stable and the deviation between the electrode plates is easily suppressed.

Desirably, the surface (the contact surface) of the deformable section 22 in contact with the secondary cell 12 is smaller than the positive electrode 31, and the deformable section 22 is disposed so as to oppose the positive electrode 31 with the sidewall 13A in between. In such a case, the entire contact surface of the deformable section 22 is disposed so as to oppose the positive electrode 31 and the negative electrode. While the contact surface of the deformable section 22 may be larger than the area of the electrode plate, as described above, desirably, the contact surface is a size smaller than the electrode plate so that the non-deformable section 21 opposes the peripheral portion of the electrode plate. Note that since the deformable section 22 is disposed so as to oppose a large area of the electrode plate, for example, at least 80% of the area of the electrode plate, the effect caused by the volume change of the electrode body 30 can be sufficiently mitigated.

In the power storage device 10 having the configuration described above, when the SOC of the secondary cells 12 becomes high, the electrode bodies 30 become expanded and the thicknesses thereof increase, the sidewalls 13A of the outer cans 13 pushed by the electrode bodies 30 become deformed and swell towards the outer side, and the thicknesses of the secondary cells 12 increase (see FIG. 3). When the thicknesses of the secondary cells 12 become large, the deformable sections 22 become compressed and are pushed inside the through holes 23 of the non-deformable sections 21. In other words, portions of the secondary cells 12 enter the through holes 23. Note that the non-deformable sections 21 do not become deformed and the inter-cell distances do not change. In other words, the increase in the thickness of each secondary cell 12 is absorbed by the deformable section 22 of the corresponding buffer plate 20. The buffer plates 20 applying a predetermined pressure to the electrode body 30 of each secondary cell 12 and maintaining a uniform inter-electrode plate distance reduce the reactive force created by the expansion of each secondary cell 12.

On the other hand, in the power storage device 10, when the SOC of the secondary cells 12 becomes low, the thicknesses of the electrode bodies 30 decrease (see FIG. 2). When the thicknesses of the electrode bodies 30 decrease, the sidewalls 13A of the outer cans 13 become deformed and are recessed inwards by the pressing force (the restoring force) of the deformable sections 22, and the electrode bodies 30 are pressed in the thickness direction from both sides with the sidewalls 13A in between. Since the compressive load acting on the deformable sections 22 becomes small due to the decrease in the thicknesses of the electrode bodies 30, the deformable sections 22 trying to return to the original shapes become swollen, and while swelling out to both sides in the first direction across the contact surfaces of the non-deformable sections 21, apply a predetermined pressure to the electrode bodies 30 through the sidewalls 13A. Accordingly, when the SOC is low, the resistance of the secondary cells 12 against vibration improves and the deviation between the electrode plates can be suppressed.

As described above, the power storage device 10 is capable of holding the secondary cells 12 in a stable manner while allowing the volume change in the secondary cells 12 caused by charging and discharging. Regardless of the SOC of the secondary cells 12, the buffer plates 20 are in contact with the sidewalls 13A of the outer cans 13 and apply a predetermined pressure to the electrode bodies 30. Accordingly, when the SOC is low, the resistance of the secondary cells 12 against vibration is improved, and when the SOC is high, the reactive force generated by the expansion of the secondary cells 12 can be suppressed. With the configuration in which the deformable sections 22 that are thicker than the non-deformable sections 21 are inserted in the through holes 23, for example, a cycle characteristics can be improved while reducing the inter-cell distance and miniaturizing the device.

Figure 6:
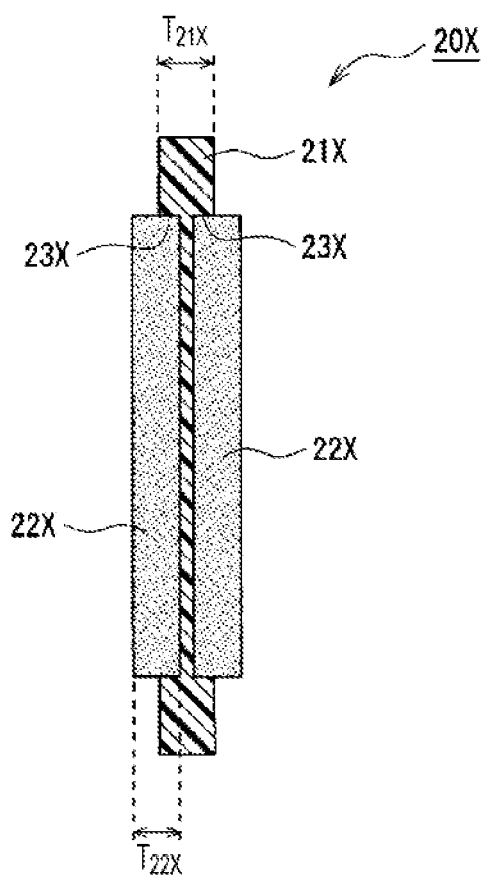
FIG. 6 is a cross-sectional view illustrating a buffer plate that is another example of the embodiment.

FIG. 6 is a cross-sectional view illustrating a buffer plate 20X that is another example of the embodiment. As illustrated as an example in FIG. 6, a point different from the non-deformable section 21 of the buffer plate 20 is that, instead of the through hole 23, recessed portions 23X are formed in a non-deformable section 21X of the buffer plate 20X. In the non-deformable section 21X, the recessed portions 23X in which deformable sections 22X are fitted are formed in both surfaces that oppose the secondary cells 12 and at a wide area other than the peripheral portion. The deformable section 22X is provided on both sides of the non-deformable section 21X and is formed thicker than the non-deformable section 21X. In such a case, it is only sufficient that a sum of thicknesses $T_{22X}$ of the deformable sections 22X is larger than a thickness T21X of the non-deformable section 21X. The thickness $T_{22X}$ of each deformable section 22X may be larger, smaller, or the same as the thickness $T_{21X}$.

Similar to the buffer plate 20, desirably, surfaces of the buffer plate 20X that are in contact with the secondary cells 12 are larger than the positive electrodes 31, and the buffer plate 20X is disposed so as to oppose the entirety of the positive electrodes 31 with the sidewalls 13A in between. Furthermore, the non-deformable section 21X is, desirably, disposed so that the edge portions of the recessed portions 23X oppose the peripheral portions of the positive electrodes 31 with the sidewalls 13A in between. Surfaces of the deformable sections 22X in contact with the secondary cells 12 are smaller than the positive electrodes 31, and the deformable sections 22X are disposed so as to oppose the positive electrodes 31 with the sidewalls 13A in between.

Even when the buffer plates 20X are used, when the SOC of the secondary cells 12 increases and the thicknesses of the electrode bodies 30 increase, the deformable sections 22X become compressed and are pushed into the recessed portions 23X. On the other hand, when the SOC of the secondary cells 12 decreases and the thicknesses of the electrode bodies 30 decrease, the deformable sections 22X swell out to both sides of the buffer plates 20 in the thickness direction. With the above, when the SOC is low, the resistance of the secondary cells 12 against vibration is improved, and when the SOC is high, the reactive force generated by the expansion of the secondary cells 12 can be suppressed.

REFERENCE SIGNS LIST 10 power storage device
11 cell stack body
12 secondary cell
13 outer can
13A, 13B sidewall
14 sealing plate
15 positive electrode terminal
16 negative electrode terminal
17 bus bar
18 end plate
19 bind bar
20, 20X buffer plate
21, 21X non-deformable section
22, 22X deformable section
23 through hole 23X recessed portion
30 electrode body
31 positive electrode

The invention claimed is:

1. A power storage device comprising:
at least one secondary cell; and
at least two buffer plates each in contact with one of sidewalls of the secondary cell, wherein said sidewalls oppose each other, wherein
each buffer plate includes a non-deformable section, and a deformable section that elastically deforms with a volume change in the secondary cell,
the non-deformable section includes a through hole or a recessed portion in which the deformable section is fitted,
the deformable section is formed thicker than the non-deformable section,
the at least one secondary cell includes an electrode body formed by alternately stacking a plurality of positive electrodes and a plurality of negative electrodes with a separator interposed therebetween, wherein
a surface of the buffer plate in contact with the secondary cell is larger than the positive electrode, and the buffer plate is disposed so as to oppose an entirety of the positive electrode with the sidewall in between, wherein
the non-deformable section is disposed so that an edge portion of the through hole or the recessed portion opposes a peripheral portion of the positive electrode with the sidewall in between, and
a surface of the deformable section in contact with the secondary cell is smaller than the positive electrode, and the deformable section is disposed so as to oppose the positive electrode with the sidewall in between.

* * * * *